Sept. 28, 1948. B. H. JORDAN 2,450,238
TAP HOLDER
Filed May 15, 1944 2 Sheets-Sheet 1
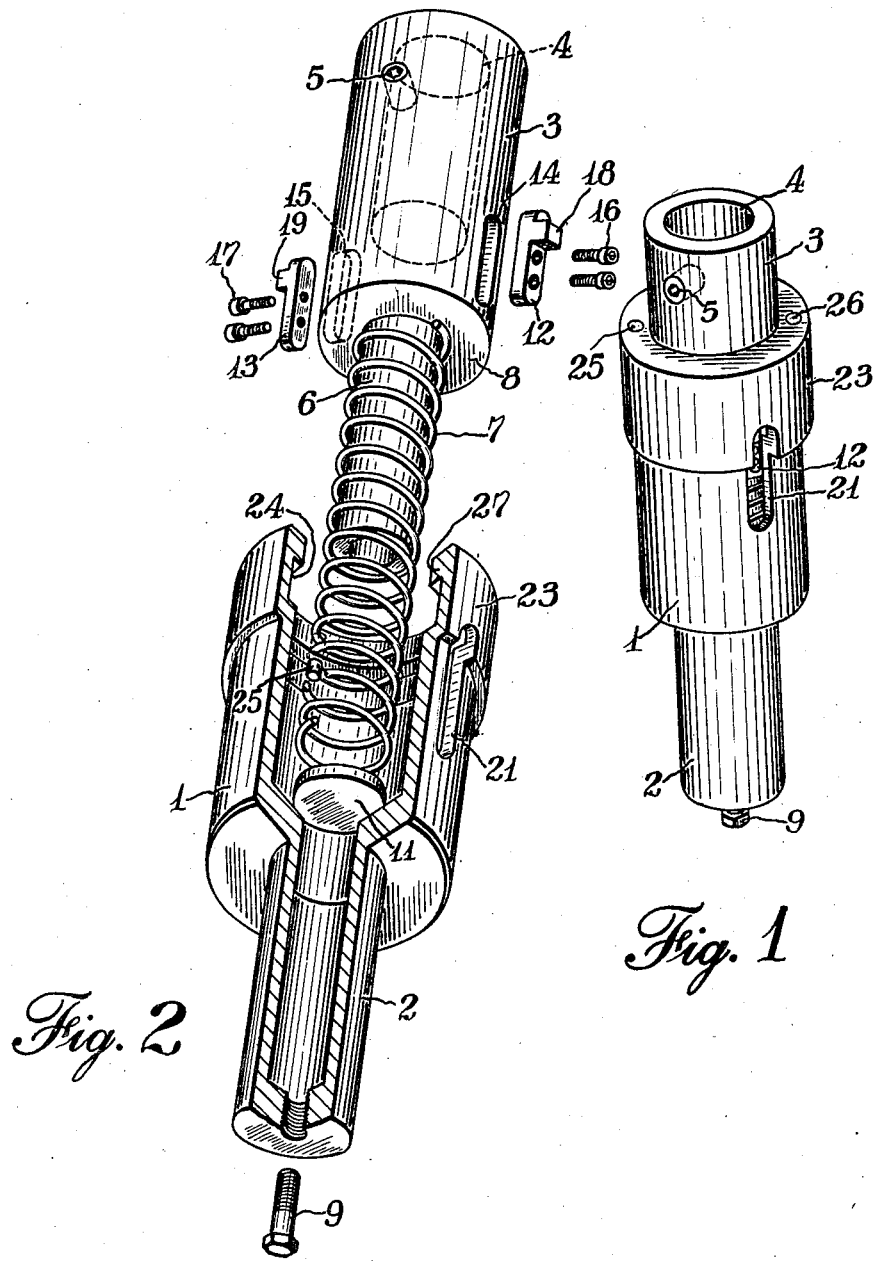
INVENTOR.
Benjamin H. Jordan
BY Clinton S. Jones.
ATTORNEY Sept. 28, 1948.   B. H. JORDAN   2,450,238
TAP HOLDER
Filed May 15, 1944   2 Sheets-Sheet 2

Witness:
Burr W. Jones

INVENTOR.
Benjamin H. Jordan
BY
ATTORNEY

Patented Sept. 28, 1948

2,450,238

UNITED STATES PATENT OFFICE 2,450,238

TAP HOLDER

Benjamin H. Jordan, Elmira, N. Y., assignor to Bendix Aviation Corporation, South Bend, Ind., a corporation of Delaware Application May 15, 1944, Serial No. 535,670

3 Claims. (Cl. 10—89)

The present invention relates to a yielding tool holder, and more particularly to a device for holding a threading tool, such as a tap, in a lathe for performing a precision threading operation.

In certain threading operations performed on a lathe, it has been found that the traversal of the threading tool into the work by the usual hand operated traversing means may cause the threads to be tapered or improperly formed. This is due to the fact that the actuating means is not sufficiently sensitive to transmit to the operator an indication of the pressure exerted on the work so that he may feed the tool into the work at the proper speed. In order to obviate this difficulty, it has been proposed to use telescopic tool holders having spring means to advance the tool into the work. Such holders as heretofore provided, however, have required nearly as much skill and care to operate as a solid holder since the depth of the tapping operation is undetermined, and no way is provided to stop the operation at a predetermined point.

It is an object of the present invention to provide a novel threading tool holder incorporating means for accurately controlling the depth of the threads formed in the work.

It is another object to provide such a device in which the threading operation is automatically stopped at a preset point.

It is a further object to provide such a device in which the tool is automatically uncoupled so as to stop the threading operation when it has progressed to the desired point.

It is another object to provide such a device in which the threading tool is again coupled up by a backward movement of its holder in order that backward rotation of the power means may withdraw the threading tool from the work.

Further objects and advantages will be apparent from the following description taken in connection with the accompanying drawing, in which:

Fig. 1 is a perspective view of the improved tool holder according to the present invention;

Fig. 2 is an enlarged exploded view of the tool holder, parts being broken away to show interior construction;

Figure 5:
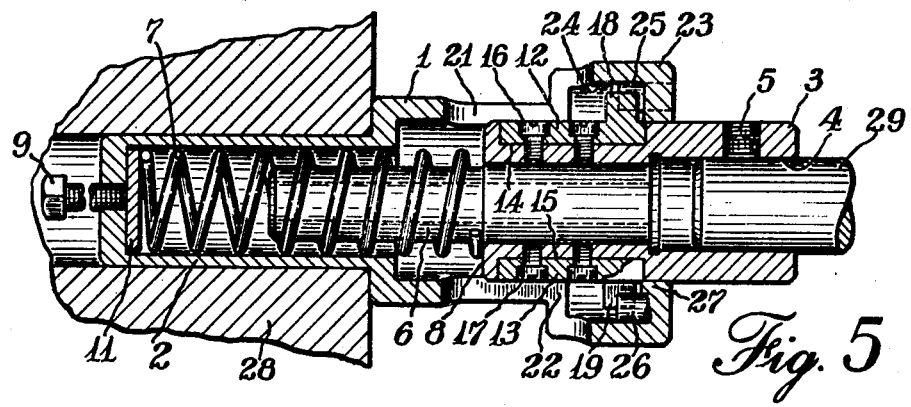
Fig. 5 is a view similar to Fig. 3 showing the positions of the parts during withdrawal of the threading tool from the work.

As shown in Fig. 1 of the drawing, the tool holder comprises a generally cylindrical body 1 having a reduced cylindrical extension 2 which is adapted to be rigidly mounted in the tool carrying slide of the lathe. It will be understood that the tool carrying slide will be of conventional construction so that detailed illustration thereof is deemed unnecessary.

As best seen in Fig. 2, the chuck or socket member 3 is arranged to be slidably mounted within the body 1 of the tool holder and is provided with an opening 4 with suitable fastening means such as a set screw 5 for receiving and rigidly holding the threading tool. Socket member 3 has a reduced cylindrical extension 6 on which is mounted a compression spring 7 which bears at one end against the shoulder 8 formed by the reduction in diameter of the socket and is arranged to fit loosely within the reduced portion 2 of the body 1 of the tool holder. Adjustable abutment means comprising a stud 9 and thrust plate 11 are provided for applying pressure to the end of the spring 7 when the socket member is positioned in the body of the tool holder in order to urge the socket member into extended relation with respect to said body.

Means for preventing relative rotation between the socket member 3 and the tool holder body 1 are provided in the form of keys 12, 13 which are seated in recesses 14, 15 in said socket member and retained therein by suitable means such as screws 16, 17. The keys 12, 13 have radially extending lugs 18, 19 respectively which slidably engage in longitudinally extending slots 21, 22 in the body of the tool holder 1, thereby splining the socket member in the tool holder.

In order to uncouple the socket member from the body of the tool holder at a predetermined longitudinal position of the socket member, the tool holder is provided with an enlarged section 23 having an interior circumferential recess 24 formed therein of sufficient depth to provide clearances for the lugs 18, 19 of keys 12, 13 so that when said lugs enter the recess, the socket is free to rotate relative to the body of the tool holder.

Means are provided for again coupling the socket member to the tool holder body by final outward movement of the socket member in order to permit withdrawal of the tool from the work. As here shown this is accomplished by means of a pair of pins or lugs 25, 26 extending into the recess 24 adjacent the end of the tool holder in position to engage the lugs 18, 19 of keys 12, 13 when the socket is at the limit of its outward movement as defined by the flange 27 formed by the outer wall of the recess 24.

Figure 3:
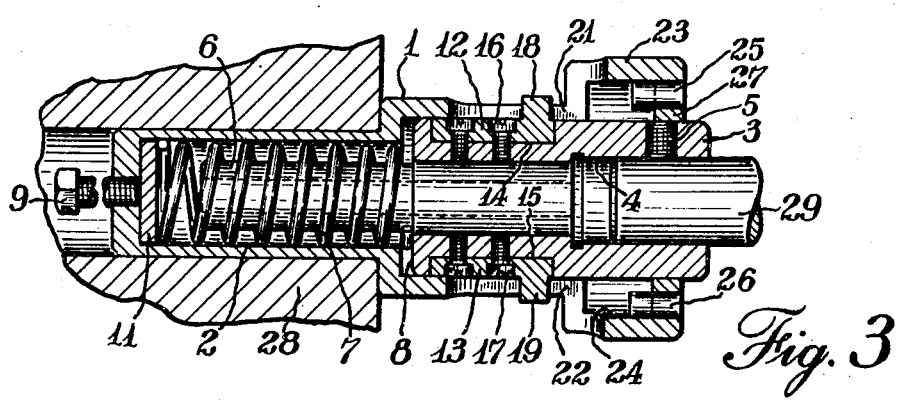
Fig. 3 is a longitudinal sectional view of the tool holder showing the parts in the positions assumed during the threading operation.

In operation, and referring first to Fig. 5 of the drawing, the tool holder is mounted in the tool carrying slide 28 of the lathe and retained therein in any conventional manner. The shank of the tool 29 is then entered in the socket member 3 and retained by tightening the set screw 5. The lathe slide is then advanced toward the work which is held in the rotating chuck of the lathe, in the usual manner, and the socket member 3 is manipulated by hand to line up the lugs 18, 19 with the slots 21, 22 and cause them to enter said slots, compressing the spring 7 as shown in Fig. 3. The tool 29 is then permitted to engage the work by virtue of the pressure exerted by the spring 7, which pressure is controlled by adjustment of the thrust stud 9.

Figure 4:
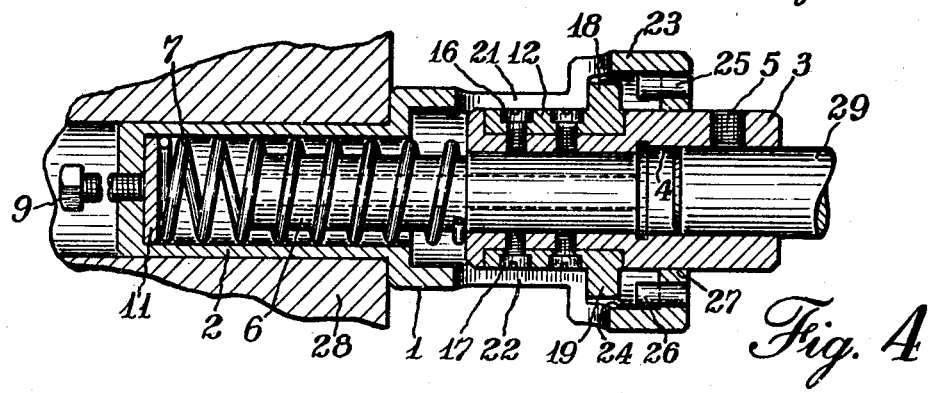
Fig. 4 is a view similar to Fig. 3 showing the parts as positioned at the end of the threading operation when the operation is automatically interrupted.

As the work is rotated by the lathe, the tool enters therein and the operator advances the slide so as to keep the lugs 18, 19 within the slots 21, 22. A stop for the lathe slide is provided in a conventional manner which stop so positions the tool holder that the lugs 18, 19 enter the recess 24 of the tool holder as shown in Fig. 4 at the instant that the desired depth of the tool in the work is attained. Entry of the lugs in said recess instantly uncouples the socket member from the tool holder body so that the tool is free to rotate with the work, and the threading operation is stopped.

In order to withdraw the tool, the operator reverses the direction of rotation of the lathe and then withdraws the slide 28 whereupon the lugs 18, 19 engage the pins 25, 26 as illustrated in Fig. 5 thus again stopping rotation of the socket member and causing the tool to thread itself out of the work.

Although but one form of the invention has been shown and described in detail, it will be understood that other embodiments are possible and that various changes may be made in the design and arrangement of the parts without departing from the spirit of the invention as defined in the claims appended hereto.

What is claimed is:

1. In a yielding threading tool holder a socket member having a cylindrical extension, a sleeve member having a bearing for receiving the cylindrical extension of the socket member and having longitudinal slots, keys fixed to the socket member having projections traversing said slots, said sleeve having a circumferential recess communicating with the ends of the slots and providing clearance for rotation of the key projections therein, and a spring in the sleeve bearing on the socket member and urging the socket member in a direction to bring the key projections into registry with the recess.

2. A tool holder as set forth in claim 1 including, further, abutments in the sleeve engageable with the keys by final longitudinal movement of the socket member under the influence of said spring.

3. A yielding threading tool holder as set forth in claim 1 including further, an abutment for the spring in the sleeve, and adjustable means in the sleeve for positioning the abutment so as to determine the pressure of the spring against the socket.

BENJAMIN H. JORDAN.

REFERENCES CITED

The following references are of record in the file of this patent:

UNITED STATES PATENTS

| Number | Name | Date |
|---|---|---|
| 770,966 | Hunter | Sept. 27, 1904 |
| 1,164,315 | Procunier | Dec. 14, 1915 |
| 1,277,915 | Grobe | Sept. 3, 1918 |
| 1,608,113 | Nace et al. | Nov. 23, 1926 |
| 1,740,887 | Crosby | Dec. 24, 1929 |
| 2,147,203 | Kylin | Feb. 14, 1939 |
| 2,206,047 | Poorman | July 2, 1940 |
| 2,340,477 | Kruse | Feb. 1, 1944 |